United States Patent [19]

Schwarzenbach

[11] 4,343,569
[45] Aug. 10, 1982

[54] APPARATUS FOR PREVENTING BLOWING OUT OF THE WATER SUPPLY OF CONSTANT PRESSURE AIR STORAGE INSTALLATIONS OF GAS TURBINE POWER PLANTS

[75] Inventor: Alfred Schwarzenbach, Wettingen, Switzerland

[73] Assignee: BBC Brown Boveri & Co. Ltd.,, Baden, Switzerland

[21] Appl. No.: 192,375

[22] Filed: Sep. 30, 1980

[30] Foreign Application Priority Data

Dec. 14, 1979 [CH] Switzerland ............... 11088/79

[51] Int. Cl.³ ............................................. B65G 5/00
[52] U.S. Cl. ...................................... 405/53; 405/55
[58] Field of Search ................................ 405/52–59, 405/210

[56] References Cited

U.S. PATENT DOCUMENTS 2,459,227  1/1949  Kerr ........................................ 405/53
2,880,593  4/1959  Johnson et al. ........................ 405/53 X
3,339,367  9/1967  Lacy ....................................... 405/210
3,552,128  1/1971  Shook ...................................... 405/59
3,986,339  10/1976  Janelid ................................... 405/53

FOREIGN PATENT DOCUMENTS 1344213  10/1963  France ..................................... 405/55

Primary Examiner—Dennis L. Taylor
Attorney, Agent, or Firm—Werner W. Kleeman

[57] ABSTRACT

An apparatus for preventing the blowing out of the water supply of constant pressure air storage installations for gas turbine power plants, which is intended to be installed as a preferably prefabricated unit at the upper end of a riser tube or pipe of an air storage cavern. The apparatus contains venting tubes, the lower ends of which are staggered in elevation. Further, there are provided guide elements which, on the one hand, guide part of the water-air mixture flowing out of the riser tube into the vent tubes or pipes and, on the other hand, form an extended flow channel for the remaining water-air mixture which directly flows into a compensation basin.

5 Claims, 8 Drawing Figures

APPARATUS FOR PREVENTING BLOWING OUT OF THE WATER SUPPLY OF CONSTANT PRESSURE AIR STORAGE INSTALLATIONS OF GAS TURBINE POWER PLANTS

CROSS REFERENCE TO RELATED CASES

This application is related to my commonly assigned, copending U.S. application Ser. No. 193,097, filed Oct. 2, 1980, entitled: "CONSTANT PRESSURE STORAGE INSTALLATION WITH WATER SUPPLY FOR GAS TURBINE POWER PLANTS" and my likewise commonly assigned, copending U.S. application Ser. No. 193,098, filed Oct. 2, 1980, entitled: "CONSTANT PRESSURE STORAGE INSTALLATION WITH WATER SUPPLY FOR GAS TURBINE POWER PLANTS".

BACKGROUND OF THE INVENTION

The present invention relates to a new and improved apparatus for preventing the blowing out of the water supply of constant pressure air storage installations of gas turbine power plants.

Generally speaking, the arrangement of the invention is used in conjunction with a subterranean cavern for the storage of compressed air and connection lines extending between the cavern and the compressor and the gas turbine, respectively, there also being provided a compensation basin and a riser tube which connects the compensation basin with the cavern.

Constant pressure air storage installations for gas turbine power plants require, in relation to air storage installations of the same efficiency or output and working with variable air pressure, which can fluctuate during operation between certain boundaries, only approximately one-third of the volume of the latter. Hence, they are less complicated in their construction and the erection costs of a cavern for constant pressure air storages are appreciably less than in the case of caverns working with variable air pressure.

To maintain the air pressure of constant pressure air storages constant there is used a water supply which compensates for the air volume which is consumed within the cavern. This water supply contains a water column which opens into a free basin which is usually located at ground level and whose static pressure gradient corresponds to the pressure which is to be maintained in the subterranean cavern. During charging of the cavern, which with present day installations is located at a depth in the order of about 600 to 800 meters, corresponding to a static pressure of the water column of 60 to 80 bar, the water is forced up into the basin, and during discharge the water runs out of the basin back into the cavern in order to ensure for the same pressure.

During operation of air storage gas turbine installations it has been found that during the charging of the caverns the water column ascending into the water supply releases air which has dissolved within the water column. Thus, air bubbles are formed whose volume rapidly upwardly increases. These air bubbles cause a density reduction in the water column, and thus, a pressure drop in the cavern. In the extreme case the water column could be blownout by the compressed air cushion, and hence, the cavern could therefore become completely emptied.

In contrast to the normal speed of dissolution of air within static water, the complete saturation of the water with air occurs more rapidly within the cavern owing to the pronounced turbulence of the water during the charging and discharging operations, since now all of the water particles soon come into contact with the air. The quantity by weight of air which is taken-up by the water is proportional to the pressure, which, as stated, with the heretofore known installations, is in the order of between 60 and 80 bar. As to the thus dissolved quantity of air the following comparison is of interest:

At 1 bar air pressure and 10° C. temperature 1 m$^3$ water (=1,000 kg) contains 29.2 gramms of air.

At 60 bar pressure at 10° C. temperature 1 m$^3$ water contains 1.7 kg air, in other words approximately 58 times the quantity by weight. At atmospheric pressure such 1.7 kg air corresponds to about 1.32 m$^3$. A water-air mixture which has expanded from 60 bar pressure to atmospheric pressure therefore contains more air than water.

If water which has been saturated with air in this manner ascends upwardly out of the cavern, then by virtue of the decreasing hydrostatic pressure the air is released and forms increasingly greater bubbles. The average density of the water column therefore becomes increasingly smaller and the pressure within the cavern correspondingly drops. If there are not undertaken appropriate measures this can lead to blow-out of the compressed air cushion along with the water column.

A heretofore known technique for preventing this blowing-out phenomenon resides in extending the riser tube containing the water column downwardly in a U-shaped arc or configuration below the base or bottom of the cavern. The lowest point of the riser tube therefore must be located approximately 0.15 h below the relevant water level within the cavern, wherein h constitutes the effective pressure gradient, i.e. the difference between the geodatic height of the upper water level in the compensation or equalization basin and the cavern water level.

With the value of h=600 meters this would mean that the already 600 meters long riser tube must be extended downwardly at least another 90 meters, and specifically, twice this value for the down and up branches, something constituting an imperissibly great increase in the construction expenditure.

SUMMARY OF THE INVENTION

Hence, it is a primary object of the present invention to overcome the previously discussed drawbacks and limitations of the prior art.

Another and more specific object of the present invention is to provide a new and improved construction of apparatus which reliably prevents the blowing-out of the water supply of a constant pressure air storage installation of a gas turbine power plant, which apparatus is relatively simple in construction and design, economical to manufacture, extremely trustworthy in operation, not readily subject to breakdown or malfunction and requires a minimum of maintenance and servicing.

Now in order to implement these and still further objects of the invention, which will become more readily apparent as the description proceeds, the blow-out prevention apparatus of the present development is manifested by the features that there are provided vent tubes whose upper ends, in their condition where they are installed in the riser tube, protrude beyond the highest water level of the compensation basin, whereas the lower ends of such vent tubes are offset in the lengthwise direction of such vent tubes in relation to one another. Additionally, guide elements are provided which are inclined towards the lengthwise axes of the vent tubes.

BRIEF DESCRIPTION OF THE DRAWINGS

The invention will be better understood and objects other than those set forth above will become more readily apparent as the description proceeds. Such description makes reference to the following drawings wherein.

DETAILED DESCRIPTION OF THE PREFERRED EMBODIMENTS

Figure 1:
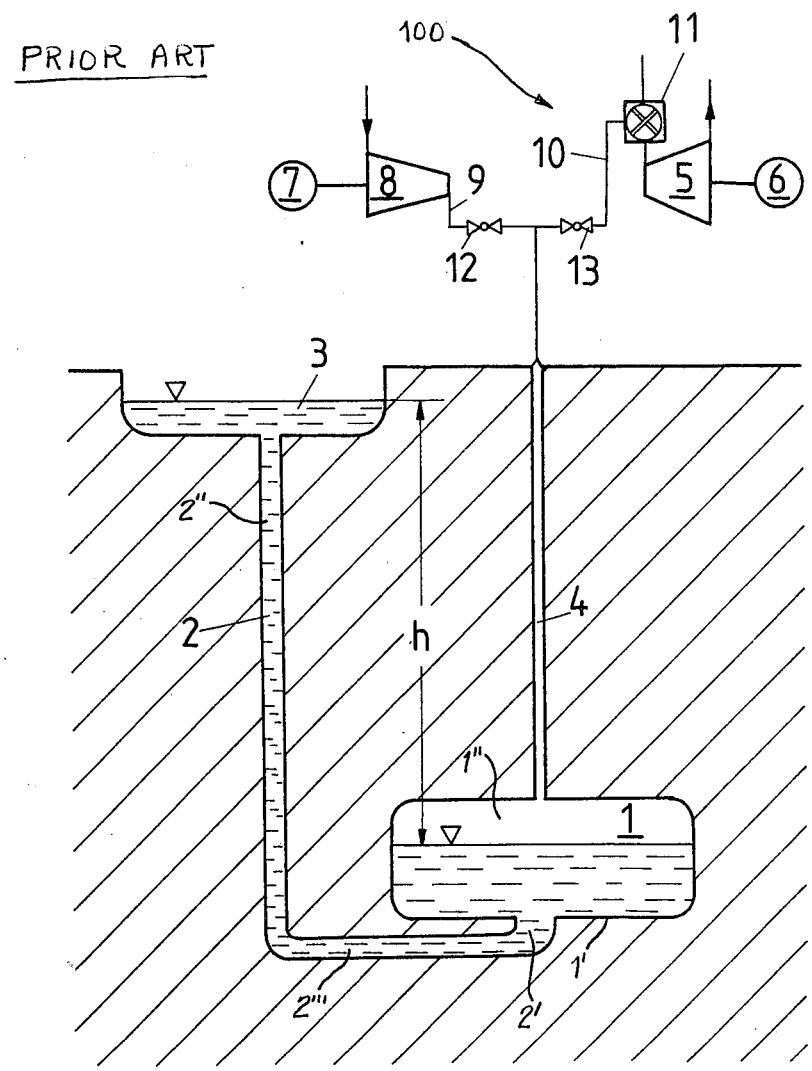
FIG. 1 schematically illustrates an air storage gas turbine power plant of conventional construction in order to illustrate the existing state-of-the-art.

Describing now the drawings, with the schematically illustrated prior art construction of constant pressure air storage installation as shown in FIG. 1 there is arranged at the base 1' of a cavern 1 the mouth 2' of a riser tube or pipe 2 whose upper pressure-generating portion 2'', having the height h between the water level of the cavern 1 and a compensation or equalization basin 3, is vertically structured. The riser tube or pipe 2 continues downwardly in the form of a substantially U-shaped channel 2''' which forms the aforementioned mouth or opening 2' leading to the base 1' of the cavern 1. To prevent blowing-out of the water column and along therewith the air within the cavern 1 owing to the previously discussed pressure gradient reduction of the water column, it would be necessary, as likewise heretofore explained, if there were not resorted to the use of the inventive measures, to extend this U-shaped channel 2''' by about 0.15 h below the lowest operationally permissible cavern water level. This would be associated with an appreciable increase in the costs of the installation.

Extending out of the air space 1'' of the cavern 1 is an air supply and removal line or conduit 4 which leads to a gas turbine installation, generally indicated by reference character 100 which is located above ground. In the drawings there have been shown, as to such gas turbine installation 100, as the primary components or parts thereof the gas turbine 5 for driving an electrogenerator 6, an air compressor 8 which can be driven by an electric motor 7 and corresponding air infeed lines 9 and 10 extending between the line 4 and the compressor 8 and the combustion chamber 11, respectively, and the related switching or change-over valves 12 and 13, respectively.

The invention is predicated upon the concept of extending the flow path of the air-water mixture and by deflecting the flow at the uppermost portion of the riser tube or pipe 2 to separate as great as possible quantity of air from the water, so that independent of the existing air bubbles there can form a continuous, uninterrupted water column throughout the length of the riser tube or pipe 2, in order to obtain the complete hydrostatic pressure which is capable of maintaining in equilibrium the maximum arising pressure within the cavern 1.

Figures 2, 3:
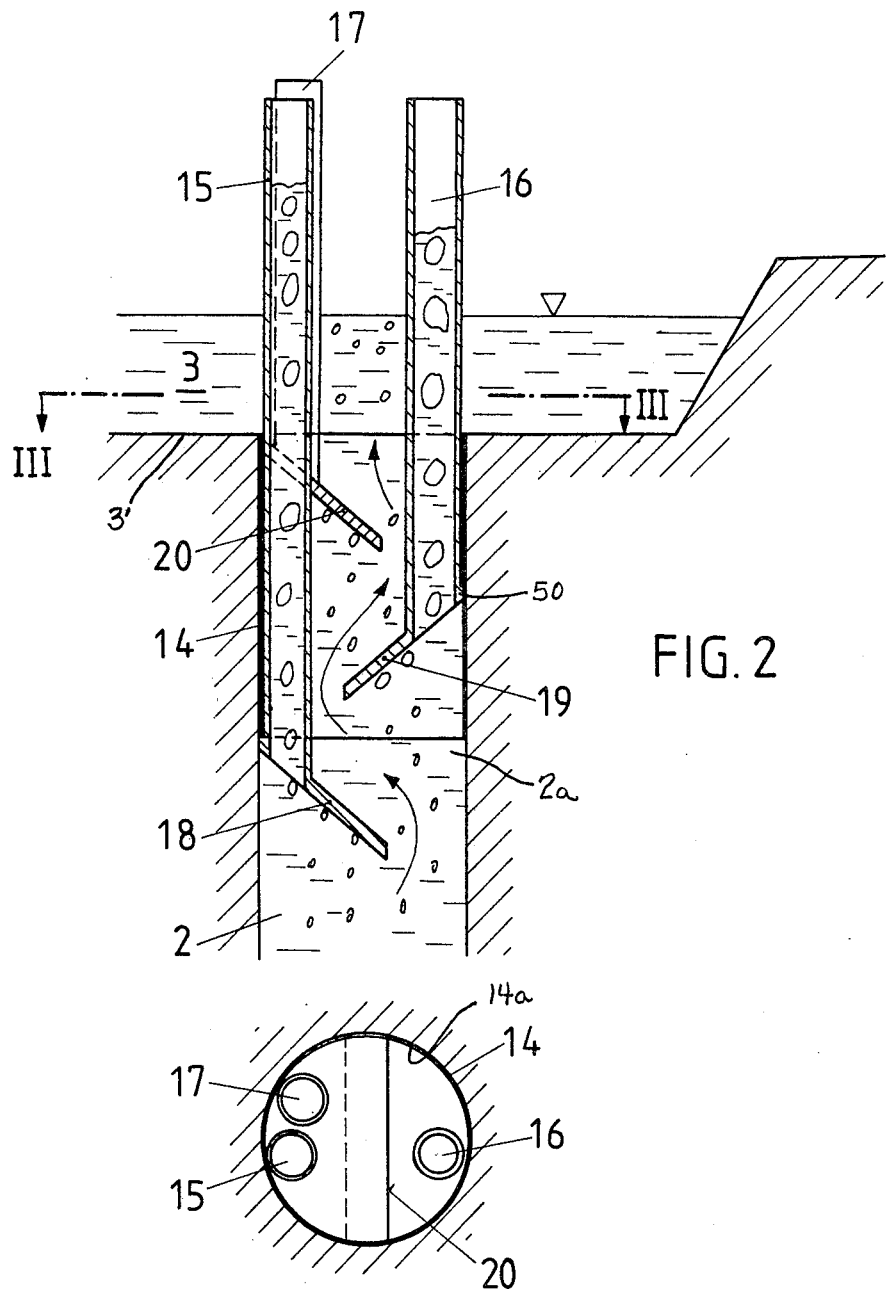
FIG. 2 is a longitudinal sectional view through a first exemplary embodiment of an inventive apparatus for avoiding the blowing-out of the water column.
FIG. 3 is a cross-sectional view of the arrangement of FIG. 2, taken substantially along the line III—III thereof.

The apparatus illustrated by way of example in FIGS. 2 and 3, by means of which this can be obtained, constitutes a prefabricated unit which after completion of the erection of the riser tube 2 can be inserted at its upper end and anchored and embedded in concrete within the riser tube duct or chute 2a by any suitable and therefore not further shown holder elements. An outer sheet metal jacket or shell 14 forms the framework of the apparatus, at which there are attached, preferably by welding, other elements. As to these elements they are constituted by three vent tubes or pipes 15, 16 and 17 which are arranged at the inner circumference 14a of the sheet metal jacket or shell 14 and extend upwardly considerably past the highest water level of the compensation basin 3. The lower ends 50 of these vent tubes or pipes 15, 16, and 17 are bevelled or camphered and extend at different depths into the riser tube 2. The vent tube 15 extends furthest downwardly, the vent tube 17 terminates slightly below the base 3' of the compensation basin 3 and the vent tube or pipe 16, situated opposite both of the other vent tubes 15 and 17, terminates at approximately half the distance between the ends of these tubes 15 and 17. The lower ends 50 of these three vent tubes 15, 16 and 17 are surrounded by downwardly inclined guide plates 18, 19 and 20, respectively, which in their projection, as best seen by referring to FIG. 2, in each case extend past one-half of the cross-section of the riser tube or pipe 2.

The function of these guide plates 18, 19 and 20 resides in conducting at least part of the water-air mixture which escapes during filling of the cavern 1 through the riser tube 2 into the compensation basin 3 into the related vent tube or pipe 15, 16 and 17, as the case may be. Within these vent tubes 15, 16 and 17 it is possible, by virtue of their large height, for the air to separate from the water, without water being entrained therefrom. The residual water flow which is not acted upon by the three vent tubes 15, 16 and 17 twistingly moves, as indicated by the arrows, about the three guide plates 18, 19 and 20 through the remaining cross-section of the riser tube upwardly and then flows directly into the compensation or equalization basin 3. The velocity of the otherwise very rapidly upwardly flowing water-air mixture is braked and the air can separate without too much water being entrained over the level of the compensation basin 3.

Figure 4:
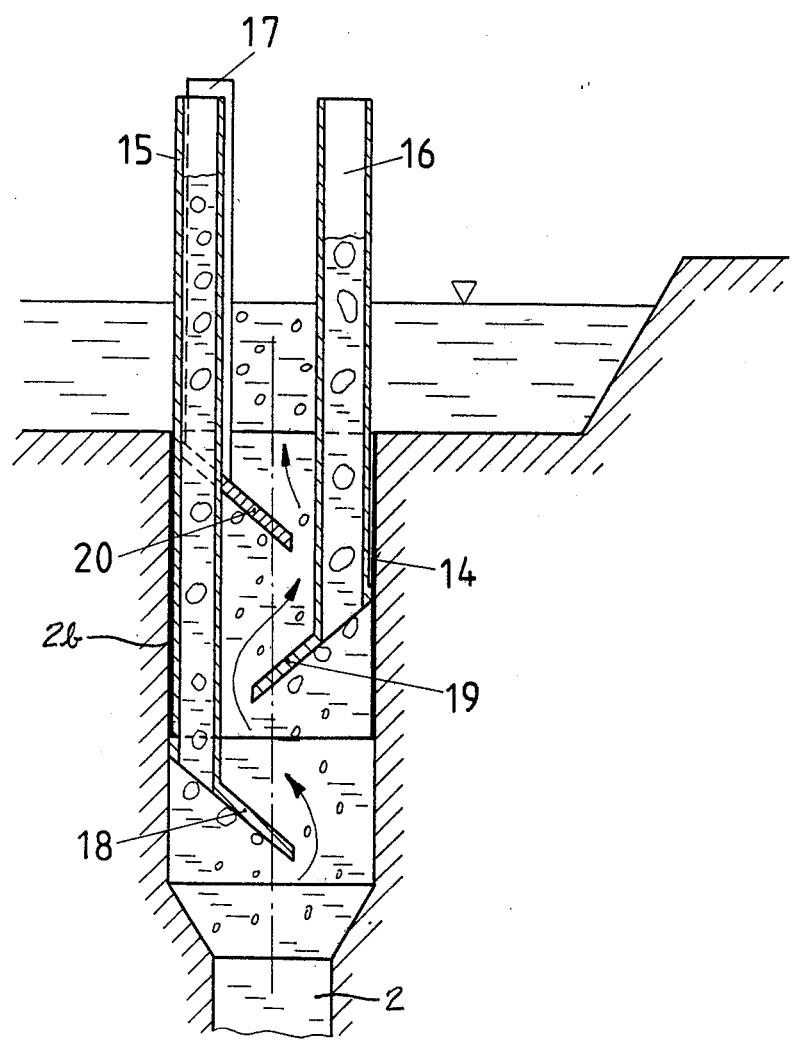
FIG. 4 is a variant embodiment of the apparatus illustrated in FIG. 2 and depicted in longitudinal sectional view.

The apparatus illustrated in FIG. 4 differs from the previously described embodiment only inasmuch as here its diameter is greater than the diameter of the riser tube 2. The same elements have therefore been designated by the same reference characters as with the embodiment of FIGS. 2 and 3.

The riser tube 2 therefore must be enlarged at its upper end 2b, in order to be able to accommodate the apparatus. This design has the advantage that the free flow cross-section and the volume are greater than in the lower portion of the riser tube 2, so that the flow velocity therein becomes smaller and there is available more time for elimination of the air bubbles than was available with the previously discussed embodiment.

Figure 5:
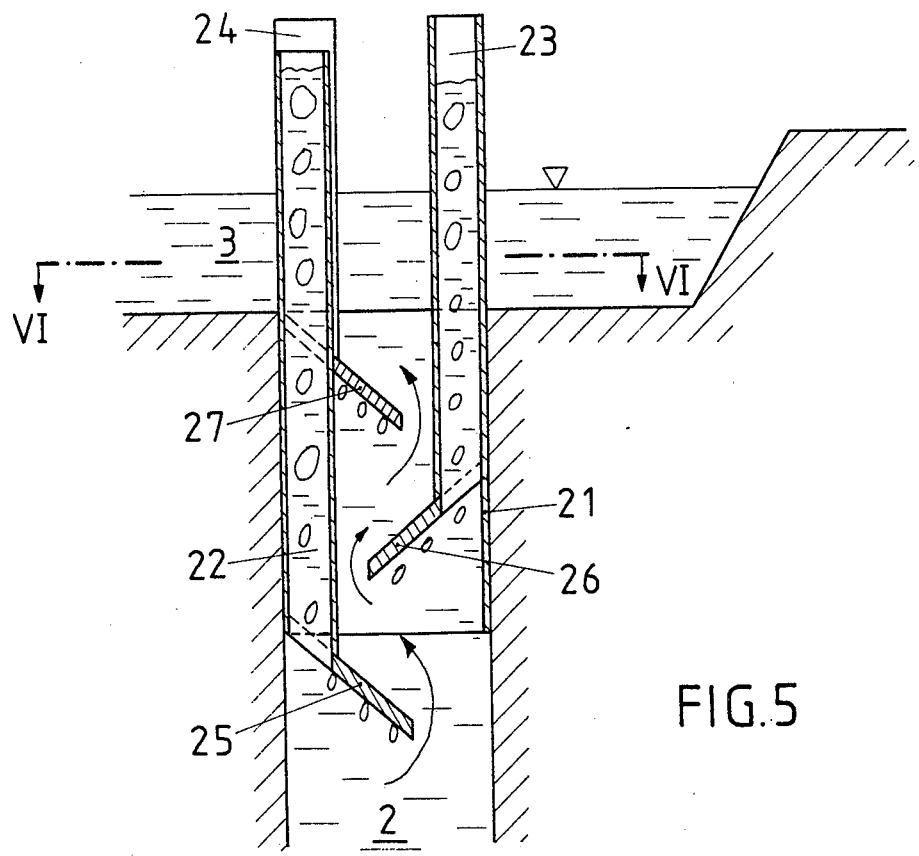
FIG. 5 illustrates a third exemplary embodiment in longitudinal sectional view of an apparatus according to the invention.
Figure 6:
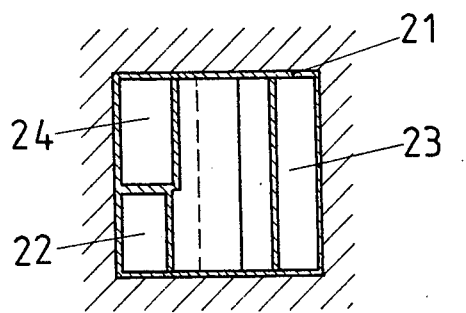
FIG. 6 is a cross-sectional view of the arrangement of FIG. 5, taken substantially along the line VI—VI thereof.

With the construction shown in FIGS. 5 and 6 the cross-section of the sheet-metal shell or jacket 21 is of square configuration and the venting tubes or pipes 22, 23 and 24 possess rectangular cross-sections, the size of which is dimensioned in each case to correspond to the quantity of water-air mixture which is to be taken-up. At the upper region the air bubbles have a greater specific volume, and consequently, also the cross-sections of the two upper vent tubes or pipes 23 and 24 are greater than that of the lowermost vent tube or pipe 22. The guide plates 25, 26 and 27, in the illustrated vertical sectional view, possess the same position as for the above-described embodiments.

Figure 7:
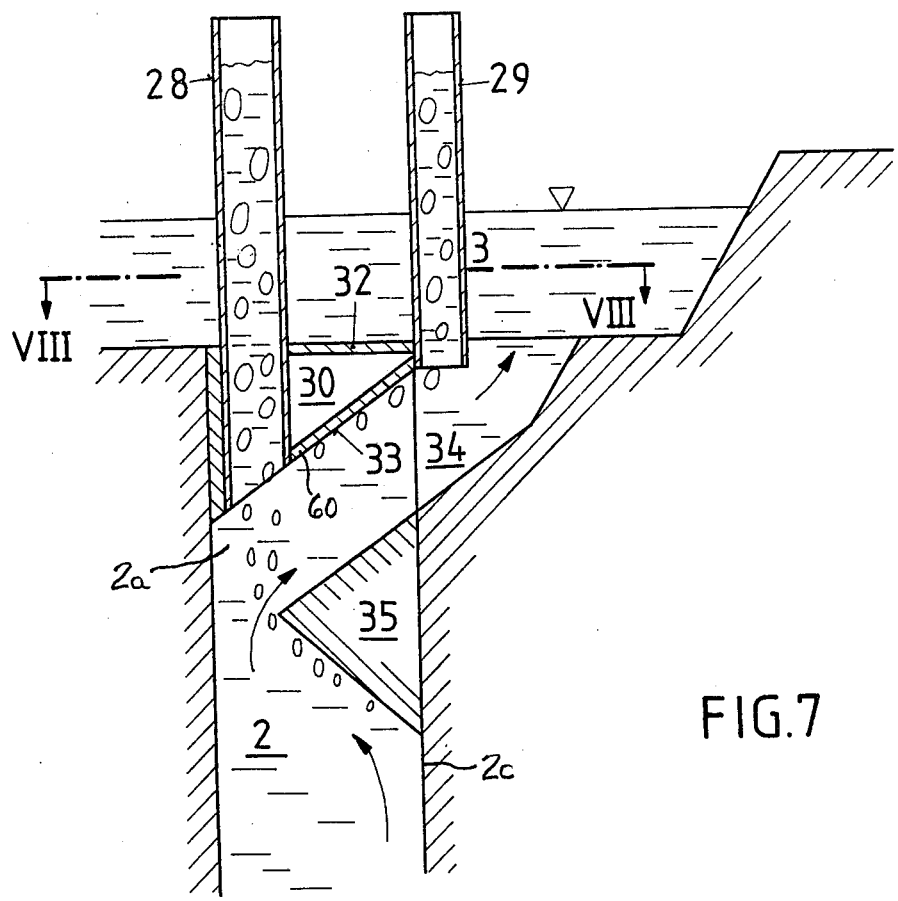
FIG. 7 is a longitudinal sectional view of a further embodiment of the invention.
Figure 8:
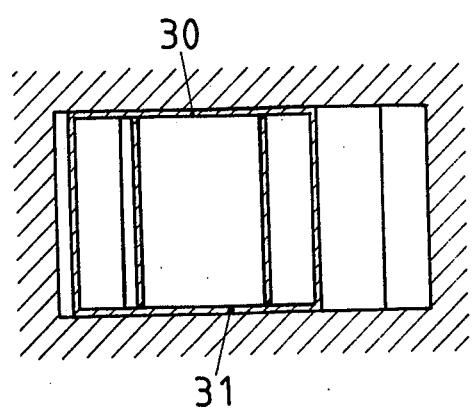
FIG. 8 is a cross-sectional view of the arrangement of FIG. 7, taken substantially along the line VIII—VIII thereof.

With the embodiments illustrated in FIGS. 7 and 8 there are only provided two vent tubes or pipes 28 and 29 which along with a box or casing 60 form an installation-ready unit. The box or casing 60 contains the side walls 30 and 31 and an upper boundary wall 32 and a lower boundary wall 33. The lower boundary wall 33 constitutes the upper boundary of an inclined channel 34 whose lower boundary is formed by a deflection body 35. The inclined channel 34 continues externally of the cross-sectional area of the riser tube or pipe 2 and opens adjacent the shorter vent tube 29 into the compensation basin 33. There is obtained in this manner, when using only two vent tubes 28 and 29, a longer path for the water-air mixture which has already been partially vented after passing the vent tubes 28 and 29. This water-air mixture then flows into the compensation basin 3 in an already relatively quiet state.

The deflection body 35 can be designed as a massive concrete body separately from or as one-piece with the lining or jacket 2c of the riser tube or pipe 2. In this case the part of the inclined channel 34 which is located externally of the cross-section of the riser tube or pipe 2 is preferably embedded in concrete.

However, it is also possible to interconnect into an installation-ready unit the vent tubes 28 and 29 and the boundary walls 32 and 33 with a deflection body 35 designed as a welded sheet metal construction and the boundary walls of the inclined channel 34 which likewise are formed of sheet metal. Such installation-ready unit can be fabricated at the factory. In this way it is possible to reduce the costs in relation to the embodiment of FIGS. 7 and 8.

For all of the here described embodiments it will be here observed that the installation thereof does not require at the mouth of the riser tube any additional expensive underground work. Thus, there is obtained an extremely economical solution of the previously described problem.

While there are shown and described present preferred embodiments of the invention it is to be distinctly understood that the invention is not limited thereto, but may be otherwise variously embodied and practiced within the scope of the following claims. Accordingly,

What I claim is:

1. An apparatus for preventing the blowing-out of the water supply of constant pressure air storage installations of gas turbine power plants containing a subterranean cavern for the storage of the compressed air and connection lines between the cavern and a compressor and a gas turbine, respectively, a compensation basin, and a riser tube interconnecting the compensation basin with the cavern, the improvement which comprises:
   a plurality of vent tubes;
   each of said vent tubes having an upper end and a lower end;
   the upper ends of said vent tubes, when mounted in the riser tube, extending beyond the highest water level of the compensation basin;
   the lower ends of said vent tubes being offset with respect to one another in the lengthwise direction of the vent tubes; and
   guide elements inclined with respect to the lengthwise axis of the vent tubes.

2. The apparatus as defined in claim 1, further including:
   jacket means for enclosing the totality of said vent tubes;
   said vent tubes being rigidly connected with said jacket means;
   the lower ends of said vent tubes being inclined with respect to the lengthwise axis of each of said vent tubes;
   the guide elements being constituted by guide plates which are located in the plane of inclined portions of the lower ends of said vent tubes;
   said guide plates being connected with the lower ends of said vent tubes in a watertight fashion at the circumference of the tube end; and
   said guide plates covering part of the cross-section of the riser tube.

3. The apparatus as defined in claim 2, wherein:
   said jacket means has a prismatic cross-sectional configuration.

4. The apparatus as defined in claim 2, wherein:
   said jacket means has a substantially cylindrical configuration.

5. The apparatus as defined in claim 1, further including:
   a box-like structure for connecting the totality of said vent tubes with one another;
   said box-like structure containing side walls and an upper boundary wall and a lower boundary wall;
   the vent tube whose lower end is located highest in elevational position being arranged externally of the cross-section of the riser tube;
   the lower end of the remaining vent tubes being provided with inclined portions extending at an inclination with respect to the lengthwise axis of the related vent tube;
   said lower boundary wall being located in a plane containing said inclined portions of the lower ends of the vent tubes;
   said lower boundary wall being connected in watertight fashion with the inclined portions of the vent tubes at the circumference of the tube end and covering the entire cross-sectional area of the riser tube;
   a deflection body arranged within the cross-sectional area of the riser tube;
   said lower boundary wall together with said deflection body forming said guide elements and delimitating with such deflection body an inclined channel; and
   said inclined channel extending laterally below the vent tube located externally of the cross-section of the riser tube.

* * * * *